(12) United States Patent
Hunter (10) Patent No.: US 9,615,015 B2
(45) Date of Patent: Apr. 4, 2017

(54) SYSTEMS METHODS FOR CAMERA CONTROL USING HISTORICAL OR PREDICTED EVENT DATA

(75) Inventor: Robert Lee Hunter, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 319 days.

(21) Appl. No.: 13/359,856

(22) Filed: Jan. 27, 2012

(65) Prior Publication Data

US 2013/0194427 A1 Aug. 1, 2013

(51) Int. Cl.
H04N 5/18 (2006.01)
H04N 5/232 (2006.01)
H04N 7/18 (2006.01)

(52) U.S. Cl.
CPC ......... *H04N 5/23206* (2013.01); *H04N 7/188* (2013.01)

(58) Field of Classification Search
None
See application file for complete search history.

(56) References Cited

U.S. PATENT DOCUMENTS

| 3,264,968 | A | | 8/1966 | De Barr, Sr. | |
|---|---|---|---|---|---|
| 3,667,351 | A | * | 6/1972 | Egli | 493/252 |
| 5,912,700 | A | * | 6/1999 | Honey et al. | 348/157 |
| 6,042,492 | A | * | 3/2000 | Baum | A63B 24/0003 434/257 |
| 6,158,155 | A | * | 12/2000 | Boney | 40/307 |
| 6,567,116 | B1 | * | 5/2003 | Aman et al. | 348/169 |
| 7,483,049 | B2 | * | 1/2009 | Aman | A63B 24/0021 348/162 |
| 8,289,185 | B2 | * | 10/2012 | Alonso | H04Q 9/00 340/870.11 |
| 8,599,267 | B2 | * | 12/2013 | Kuwano et al. | 348/169 |
| 8,608,563 | B2 | * | 12/2013 | Miyazaki | A63F 13/00 463/31 |
| 2003/0030651 | A1 | * | 2/2003 | Gibbs | G09G 5/026 345/619 |

(Continued)

OTHER PUBLICATIONS

"Photo finish", wikipedia, the free encyclopedia, retrieved date Mar. 1, 2011, download from Internet: http://en.wikipedia.org/wiki/Photo_finish, 3pgs.

(Continued)

*Primary Examiner* — Tracy Y Li
*Assistant Examiner* — Mohammad J Rahman
(74) *Attorney, Agent, or Firm* — McCormick, Paulding & Huber LLP (57) ABSTRACT

According to some embodiments, systems, methods, apparatus, and computer program code for controlling a video camera to capture video associated with an event are provided which use historical or predictive data. In some embodiments, historical event information and participant information is received. Video camera configuration and position data is received, as well as current event data. The current event data may be received substantially in real time from the event. Video camera control signals are generated based on at least one of the event information, the participant information, and the current event data. The control signals are transmitted to a video camera to control the operation of the video camera.

17 Claims, 6 Drawing Sheets

(56) References Cited

U.S. PATENT DOCUMENTS

| | | | | |
|---|---|---|---|---|
| 2004/0042783 | A1* | 3/2004 | Diana | F16M 11/10 396/427 |
| 2004/0081338 | A1* | 4/2004 | Takenaka | G08B 13/1961 382/118 |
| 2004/0127284 | A1* | 7/2004 | Walker | G07F 17/32 463/30 |
| 2004/0194129 | A1* | 9/2004 | Carlbom | H04N 7/181 725/32 |
| 2005/0012817 | A1* | 1/2005 | Hampapur | H04N 7/185 348/143 |
| 2005/0057653 | A1* | 3/2005 | Maruya | G08B 13/19608 348/159 |
| 2005/0280711 | A1* | 12/2005 | Ishii | H04N 5/232 348/207.99 |
| 2007/0130538 | A1* | 6/2007 | Chiu | G06F 17/3089 715/792 |
| 2007/0279494 | A1* | 12/2007 | Aman | G01S 3/7864 348/169 |
| 2008/0089666 | A1* | 4/2008 | Aman | 386/95 |
| 2009/0046152 | A1* | 2/2009 | Aman | A63B 24/0021 348/157 |
| 2009/0208054 | A1* | 8/2009 | Angell | G06K 9/00771 382/103 |
| 2010/0283630 | A1* | 11/2010 | Alonso | H04Q 9/00 340/870.11 |
| 2011/0090344 | A1* | 4/2011 | Gefen | G06T 7/204 348/169 |
| 2011/0169959 | A1* | 7/2011 | DeAngelis | A63B 24/0021 348/157 |
| 2011/0173235 | A1* | 7/2011 | Aman | A63B 24/0021 707/792 |
| 2011/0181420 | A1* | 7/2011 | Mack | A42B 3/046 340/573.1 |
| 2012/0119440 | A1* | 5/2012 | Snow | G07F 17/3293 273/292 |
| 2012/0162434 | A1* | 6/2012 | Elangovan | G06K 9/342 348/157 |
| 2012/0170427 | A1* | 7/2012 | Saunders et al. | 368/113 |
| 2012/0233000 | A1* | 9/2012 | Fisher et al. | 705/14.71 |
| 2012/0238336 | A1* | 9/2012 | Amaitis et al. | 463/6 |
| 2013/0066448 | A1* | 3/2013 | Alonso | H04Q 9/00 700/91 |
| 2013/0198176 | A1* | 8/2013 | Kim | 707/724 |
| 2014/0052279 | A1* | 2/2014 | Van Rens | 700/91 |

OTHER PUBLICATIONS

"TV Production Handbook Zettl Chapter 5" (2006), (pp. 100-102, 3 pages total).

* cited by examiner

| EVENT ID | EVENT DESCRIPTION | EVENT DURATION |
|---|---|---|
| E_01 | Track and field, 100 meter, men's, NCAA | 10-12 Sec |
| E_02 | Track and field, 100 meter, men's, High School | 10-15 Sec |
| E_03 | Swim, 200 IM, men's, Worlds | 114 – 150 Sec |
| E_04 | Track and field, 400 meter | 40-55 Sec |

| ATHELETE ID | ATHLETE NAME | EVENT ID |
|---|---|---|
| A_01 | Bolt, Usain | E_01 |
| A_02 | Phelps, Michael | E_10 |
| A_03 | Thompson, Jenny | E_09 |
| A_04 | Lochte, Ryan | E_10 |

SYSTEMS METHODS FOR CAMERA CONTROL USING HISTORICAL OR PREDICTED EVENT DATA

FIELD

The present invention relates to systems and methods for controlling cameras. Some embodiments relate to systems and methods to control cameras using historical or predicted event data.

BACKGROUND

A wide variety of types of events are captured by video cameras for broadcast or other viewing. Many types of events require cameras to be panned, tilted or zoomed during the event to properly capture the action. Live operators are required to physically operate these cameras. For example, track and field events, such as a 100 meter race, require one or more video cameras to be panned and zoomed across at least a 100 meter field of view. A 400 meter race requires one or more video cameras to track the runners as they circle the track. Manning live cameras for live events can be expensive. Some systems provide joysticks or other remote operator-controlled devices which allow individual cameras to be remotely controlled, however these systems require that a live operator manipulate the joystick to control each camera. It would be desirable to provide camera controls which allow certain types of events to be captured without live operators.

DETAILED DESCRIPTION

Applicants have recognized that there is a need for methods, systems, apparatus, means and computer program products to control video cameras using historical or predicted event data. According to some embodiments, systems, methods, apparatus, and computer program code for controlling a video camera to capture video associated with an event are provided which use historical or predictive data. In some embodiments, event characteristic information and participant information is received. Video camera configuration and position data is received, as well as current event data (such as a signal indicating the start of a race, etc.). The current event data may be received substantially in real time from the event. Video camera control signals are generated based on some (or all) of the information received, including the event characteristic information, the participant information, and the current event data. The control signals are transmitted to a video camera to control the operation of the video camera.

Features according to some embodiments will be described by first referring to FIG. 1, which illustrates a system 100 in which a video camera 110 is positioned to capture a video feed associated with an event 102 (such as a live sporting event or the like). The video camera 110 is in communication with a camera control system 120 which provides dynamic adjustment and control data to control the operation and orientation of the video camera 110. For example, the video camera 110 may be a robotically operated video camera which is capable of receiving and responding to control data, including data to pan, tilt, zoom, focus, or otherwise control operation of the video camera 110.

Pursuant to some embodiments, the camera control system 120 receives historical data 130 including, for example, event characteristic data and athlete or participant data. For example, the event characteristic data may include data associated with the specific event to be captured by the video camera 110. As an illustrative example, provided to describe, but not limit, features of some embodiments, the event 102 is a track and field event—the Prefontaine Classic held in Eugene, Oreg., and the race to be broadcast is the 100 meter men's finals. Athletes participating in the finals include Usain Bolt, as well as a number of other world-class athletes. Pursuant to some embodiments, historical event characteristic information associated with prior 100 meter men's races may be used to identify a relevant set of camera control parameters to use to control the video camera 110. Further, athlete or participant information may also be used to further refine the camera control parameters.

Continuing the specific illustrative example, event characteristic information about the event include data classifying a type of the event, including the fact that it is an outdoor track event, with a distance of 100 meters. Further, the event is typically run in under 10 seconds. Further, athlete data associated with Usain Bolt indicates that he is capable of running the event under 10 seconds, and could possibly run the race under 9.58 seconds. Historical event characteristic data about the Prefontaine Classic may include information about the relative direction of the race (it's typically run from left to right when facing the track from the stands), the fact that the race is run outdoors, and other location-specific or event-specific information. Using this historical data, embodiments control the operation of the video camera 110 to capture all or portions of the event, without need for a human operator to man the camera during the event. Instead, the video camera 110 can be controlled under direction of the camera control system 120 during the event. In some embodiments, operation of the video camera 110 from the start of the race until the completion of the race is entirely automated and under the control of the camera control system 120.

Figure 1:
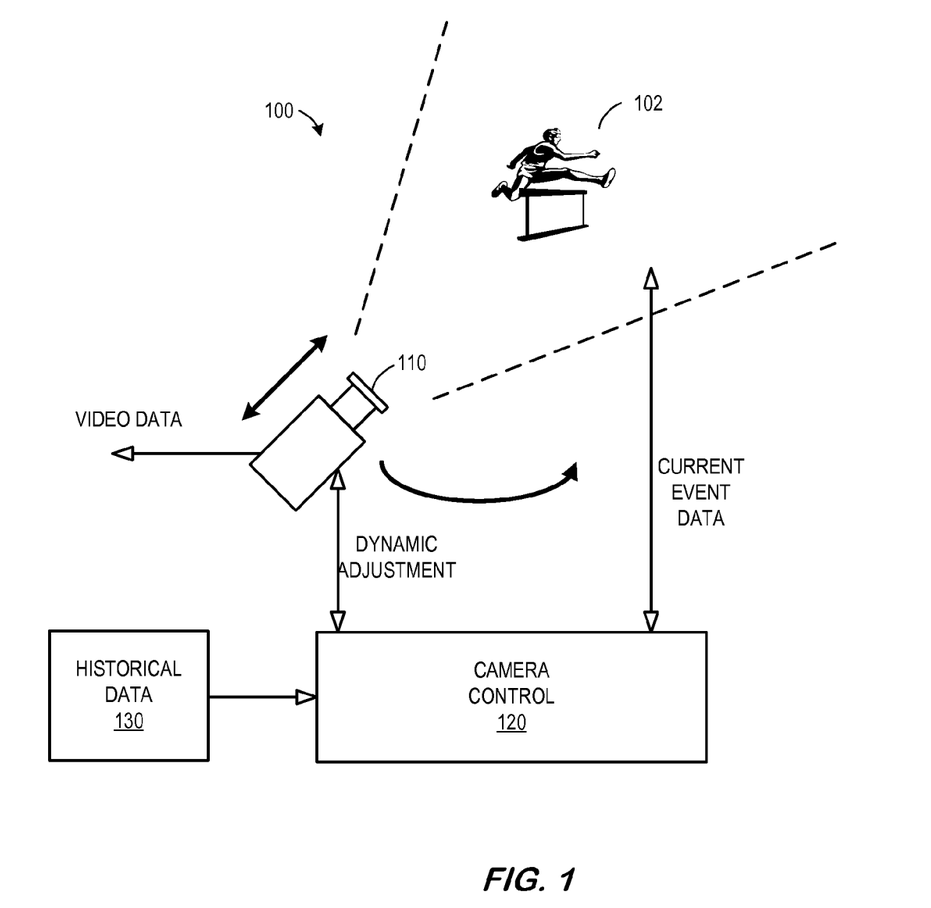
FIG. 1 is an illustration of a system in accordance with some embodiments.

As shown in FIG. 1, data associated with the actual event 102 may also be received by the camera control system 120. For example, the data may include a start of the race triggered by a starter's timer, the completion of a race, or the like. As a specific illustrative example, a video camera 110 located to capture the 100 meters men's final at the Prefontaine Classic may be triggered or caused to start panning and zooming along the expected path of the runners, at the expected pace, as soon as information identifying the start of the race is received. The camera control system 120 may compute the expected acceleration and velocity of the lead runners based on the historical data 130, and may start the panning and zooming (and other controls) based on the computed expected acceleration and velocity once the race starts.

In some embodiments, the camera control system 120 may include video or audio recognition software to identify an event or action that is used to trigger the start of camera control. For example, in the case of video recognition, camera control system 120 may include (or receive data from) a motion detection unit which compares video frame data to identify an action or movement that signals or can be used to start the camera control of the present invention. The motion detection unit may compare the current camera video frame data to the previous video frame to identify a movement or action or other change in the video frame data which should be used to start the camera control of the present invention. As an illustrative example where the system of the present invention is used to capture video data associated with a Nordic Combined ski event, the start of camera control may be triggered when a motion detection unit identifies that a skier has entered the zone to be covered by a video camera 110. Other event detection devices or approaches may be used to signal or trigger the start of a camera control action pursuant to the present invention. Pursuant to some embodiments, the start of the camera control action is performed based on an automated detection of the start of an event or portion of an event to be captured (e.g., via a motion detection unit, an audio detection unit or the like).

In this way, the video camera 110 will generate a video feed (e.g., a video feed to be broadcast to viewers) that matches the expected or calculated path of selected athletes. The video feed is produced at significantly lower cost than would be possible with a manned video camera. As used herein, the phrases "video feed" and "received image" may refer to any signal conveying information about a moving or still image, such as a High Definition-Serial Data Interface ("HD-SDI") signal transmitted in accordance with the Society of Motion Picture and Television Engineers 292M standard. Although HD signals may be described in some examples presented herein, note that embodiments may be associated with any other type of video feed, including a standard broadcast feed and/or a 3D image feed. Moreover, video feeds and/or received images might comprise, for example, an HD-SDI signal exchanged through a fiber cable and/or a satellite transmission. The video feed data output from video camera 110 may be transmitted to a production facility (not shown) for cutting and editing prior to broadcast to viewers or other use.

Note that the video camera 110 may be any device capable of generating a video feed, such as a Sony® broadcast camera with a pan, tilt and zoom head and that is capable of being robotically or remotely controlled, and that is capable of receiving and responding, substantially in real-time, to control signals causing dynamic adjustments to be made to the video camera 110. As used herein, the phrase "dynamic adjustments" might refer to, for example, a panning motion, a tilting motion, a focal change, and/or a zooming adjustment being made to a video camera (e.g., zooming the camera in or out). In some embodiments, the robotically operated video camera 110 may be adapted to provide information to the camera control system 120. This information may be provided substantially in real-time, and may include information about the current state or orientation of the video camera 110 based on the dynamic adjustments made to the video camera, such as a panning motion, a tilting motion, a focal change, and/or a zooming adjustment.

The camera control system 120 could be implemented using a Personal Computer (PC) running a Windows® Operating System ("OS") or an Apple® computing platform, or other computing device. In some embodiments, the camera control system 120 is remotely located from the video camera 110, and further, in some embodiments, the camera control system 120 may be remotely located from the event 102 (e.g., such as in a production control facility or the like). Communication between the camera control system 120 and video camera 110 may be via a wired or wireless communication network. The result is systems and methods which allow one or more video cameras to be controlled in an automated fashion, without need for live operators for each camera.

Figure 2:
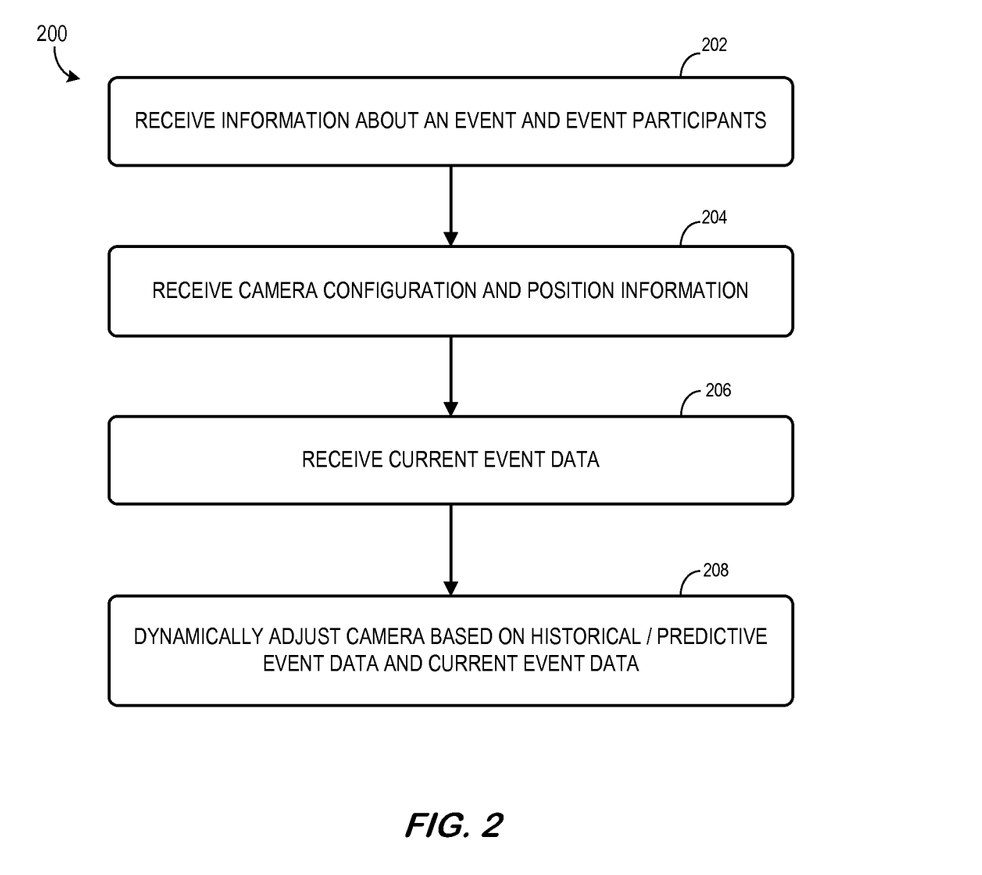
FIG. 2 is a flow chart of a method in accordance with some embodiments of the present invention.

FIG. 2 illustrates a method that might be performed, for example, by some or all of the elements described herein. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein. In some embodiments, the process of FIG. 2 is executed under control of a camera control system such as the system 120 of FIG. 1.

Processing begins at 202, where information may be received about an event and event participants. For example, the information may include information received from an operator of camera control system 120 during event planning or set up, while the camera(s) are being positioned. Such data may include information identifying the specific event for which video is to be captured (such as the "Prefontaine Classic"), information identifying event characteristic data (e.g., the event is a track and field event, of the type "100 meter mens") as well as information identifying the participants (such as the name of one or more athletes who will be participating in the specific event, as well as their expected pace and completion time). Alternatively, or in addition, some or all of the event and athlete data may be retrieved from a database in an automated or semi-automated fashion. In some embodiments, the data received at 202 may be used in camera setup as well as for later control of the video camera 110 during the event. Some or all of the data received at 202 may be received from one or more external or internal data sources (such as historical data 130 of FIG. 1). Further, some or all of the data may be received from operator input (e.g., via an operator interface or input device as described below in conjunction with FIG. 3). For example, in some embodiments, each video camera 110 may be set up or configured so that the video camera's range of motion is oriented to include a starting line or home position.

At 204, processing continues where camera configuration and position information is received. For example, when one or more video cameras 110 are set up for use in capturing video data at an event 102, they may be connected (via a wired or wireless network) to the camera control system 120. Information about the position and orientation of each camera may be captured when the cameras are initially configured so that the camera control system 120 can track the orientation and configuration of each camera during the event.

Processing at 206 includes receiving current event data. For example, a sensor or other device located at the event may be triggered to transmit current event data to the camera control system 120 when the event starts (e.g., it may be triggered by a starters gun at a track and field event or swim meet). Current event data may also include data identifying a "restart" or "reset" of the processing. In some embodiments, the current event data 120 may be provided by user input and transmitted to the camera control system 120. The current event data 120 may be used by the camera control system 120 to cause the operation and adjusting of video cameras 110 pursuant to the present invention.

Processing continues at 208, where the one or more video cameras 110 are dynamically adjusted based on historical or predictive event data received or generated at 202 and based on the current event data received at 206. For example, in a track and field event such as the mens 100 meter race described above, processing at 208 may include generating a series of control signals to cause one or more video cameras to pan, zoom and focus on the expected path of the runners, at the expected pace. The camera control signals generated at 208 may be generated in real time during the event, or they may be generated prior to the start of an event based on the historical data. In the example, since Usain Bolt is racing, and because of the data associated with his past performances, an expected trajectory of the race may be pre-computed by the camera control system 120, and camera control signals may be pre-established. The trigger causing the execution or transmission of the pre-established control signals may be receipt of the current event data (e.g., the exact time of the start of the race). In situations where a "restart" or "reset" of the pre-established camera control signals is required (e.g., such as when an athlete has a false start, etc.), the pre-established control signals may be reset and restarted from the beginning.

Figure 3:
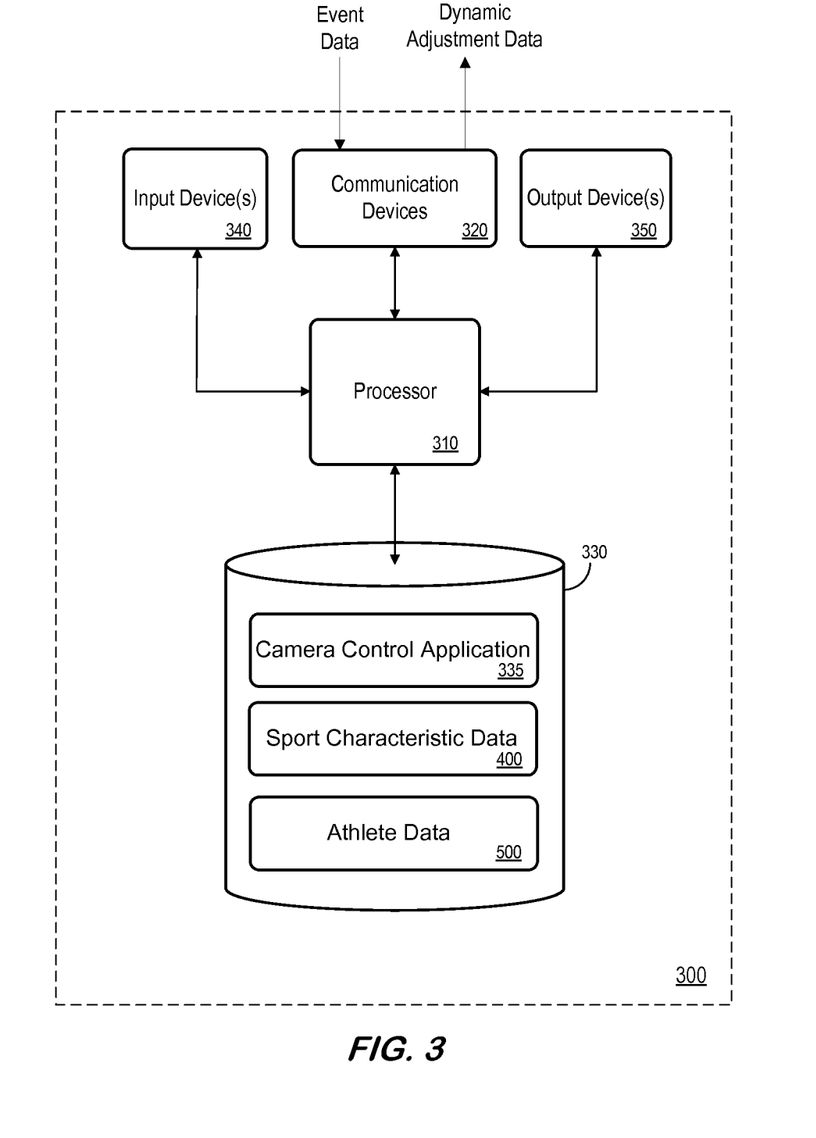
FIG. 3 is a block diagram of a camera control system in accordance with some embodiments of the present invention.

FIG. 3 is a block diagram of a camera control system 300 that might be associated with, for example, the system 100 of FIG. 1 in accordance with some embodiments of the present invention. The camera control system 300 comprises a processor 310, such as one or more INTEL® Pentium® processors, coupled to communication devices 320 configured to communicate with remote devices (not shown in FIG. 3). The communication devices 320 may be used, for example, to receive current event data from sensors or devices at the event 102 (such as the start of a race, etc.) as well as data from one or more robotic video cameras 110 at the event, and to transmit control data to dynamically adjust the orientation and operation of one or more video cameras 110 at the event.

The processor 310 is also in communication with an input device 340. The input device 340 may comprise, for example, a keyboard, a mouse, or computer media reader. Such an input device 340 may be used, for example, to enter information about an event for which video feed data is to be captured and/or to set up one or more video cameras 110 for use in capturing video from an event. The processor 310 is also in communication with an output device 350. The output device 350 may comprise, for example, a display screen or printer. Such an output device 350 may be used, for example, to provide information about an event, about video camera 110 set up, or the like, to an operator.

The processor 310 is also in communication with a storage device 330. The storage device 330 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 330 stores a camera control application 335 for controlling the processor 310. The processor 310 performs instructions of the application 335, and thereby operates in accordance with any embodiments of the present invention described herein. For example, the processor 310 may receive information about one or more video cameras 110 (including their orientation and operational status) as well as current event data associated with an event 102 (such as, for example, the start of a race, or the like). Camera control application 335 causes the operation of the camera control system 120 as described herein (e.g., such as described in conjunction with FIG. 2 to remotely control the usage and operation of one or more video cameras 110 based on historical event and participant data).

As used herein, information may be "received" by or "transmitted" to, for example: (i) the camera control system 300 from other devices; or (ii) a software application or module within camera control system 300 from another software application, module, or any other source.

As shown in FIG. 3, the storage device 330 also stores (or, in some embodiments, has access to) historical data for use in controlling the operation of one or more video cameras 110 pursuant to the present invention. As depicted in FIG. 3, the historical data may be stored in datasets identified as sport characteristic data 400 and athlete data 500 (together, generally referred to herein as "historical" data). One example of such a database 400 that may be used in connection with the camera control system 300 will now be described in detail with respect to FIG. 3. The illustration and accompanying descriptions of the database presented herein are exemplary, and any number of other database arrangements could be employed besides those suggested by the figures.

Figure 4:
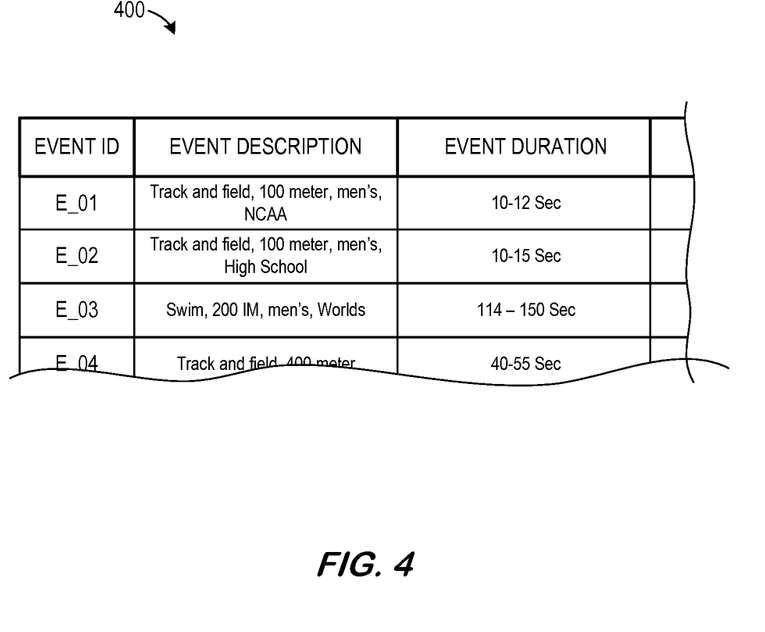
FIG. 4 is a tabular representation of a portion of a historical event data table in accordance with some embodiments of the present invention.

FIG. 4 is a tabular representation of a portion of a sport characteristic data table 400 in accordance with some embodiments of the present invention. The table 400 includes entries associated with different sporting events. The table 400 also defines fields for each of the entries. For example, the sport characteristic data table 400 may include fields specifying, for each event, an event identifier (used to uniquely identify a specific event type), an event description (e.g., such as information classifying the type of event), an event duration (e.g., specifying the historical event duration), etc. The fields shown in FIG. 4 are for illustrative purposes and may include any of a number of different types of data to allow an event to be characterized and to predict how the event may unfold. For example, additional data may be included for specific events that are held on a regular basis (such as the Prefontaine Classic), that are at a specific location, or that have a known path or region for a camera to traverse. This data is used, for example, by the camera control system to match a current event with camera control parameters that allow one or more video cameras to be controlled in an automated fashion.

Figure 5:
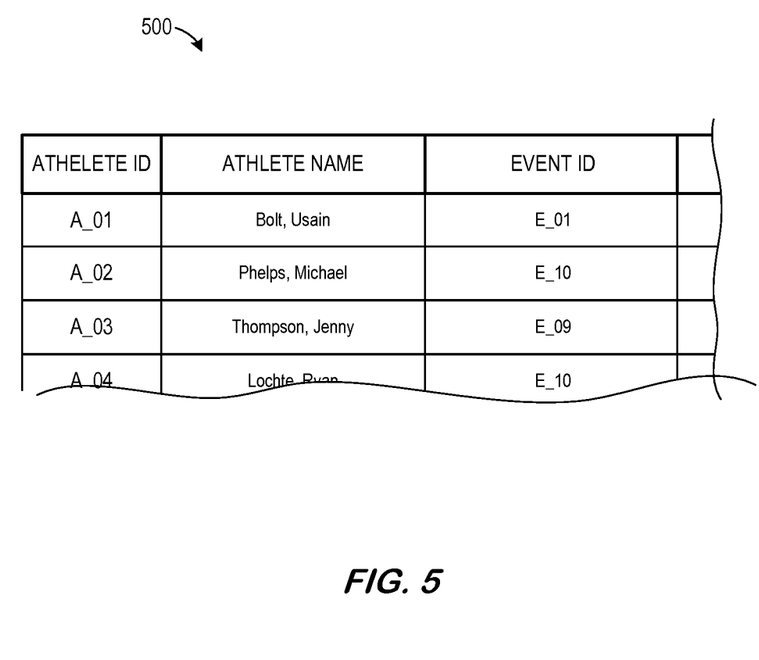
FIG. 5 is a tabular representation of a portion of an athlete or participant data table in accordance with some embodiments of the present invention.

FIG. 5 is a tabular representation of a portion of an athlete data table 500 in accordance with some embodiments of the present invention. The table 500 includes entries associated with different athletes or event participants. The table 500 also defines fields for each of the entries. For example, the table 500 may store information about individual participants in different events, such as, a unique athlete or participant identifier, the athlete's name, the type of event(s) the athlete participates in, the athlete's most recent time in each event, the athlete's average time in the event, etc. This information may be used by the camera control system, along with other historical and event-specific data, to generate camera control signals allowing remote, automated control of one or more video cameras to capture a video feed of events the athlete is participating in. In some embodiments, information about a group of athletes in an event are used to generate the camera control signals. For example, in the Prefontaine Classic example introduced above, there may be 10 athletes participating in the 100 meter men's finals. Analysis of the athlete data may indicate that three of those athletes may be expected to run the race in 10 seconds or less, while the average time will be 10.2 seconds. This data may be used to control one or more video cameras to ensure that at least one camera follows the expected trajectory of the top three athletes, while another camera may be controlled to follow the expected trajectory of the rest of the pack of athletes. Those skilled in the art, upon reading this disclosure, will appreciate that other types and uses of athlete or participant data may be used in conjunction with the present invention to allow automated and accurate remote control of one or more video cameras.

Pursuant to some embodiments, camera control system 300 may store, or have access to, additional data not shown in FIG. 3 or FIGS. 4-5. For example, camera control system 300 may store camera data associated with the one or more video cameras 110 positioned at an event. The storage and use of such data may be particularly beneficial in situations such as the embodiment of FIG. 6 (discussed further below) where multiple robotic video cameras 110 are deployed at an event 102. For example, camera control system 300 may store data identifying each video camera (such as by a camera identifier), a location of each video camera (such as a distance between a camera and the field or event), an orientation of each video camera, as well as current operational data for each video camera (such as information identifying tilt data, zoom data, focus data, field of view data, etc). The storage or access to such camera data may allow embodiments to perform more fine control of each camera, including, for example, cutting between different video cameras 110 in an automated fashion based on a location (or expected location) of athletes, or the like.

Figure 6:
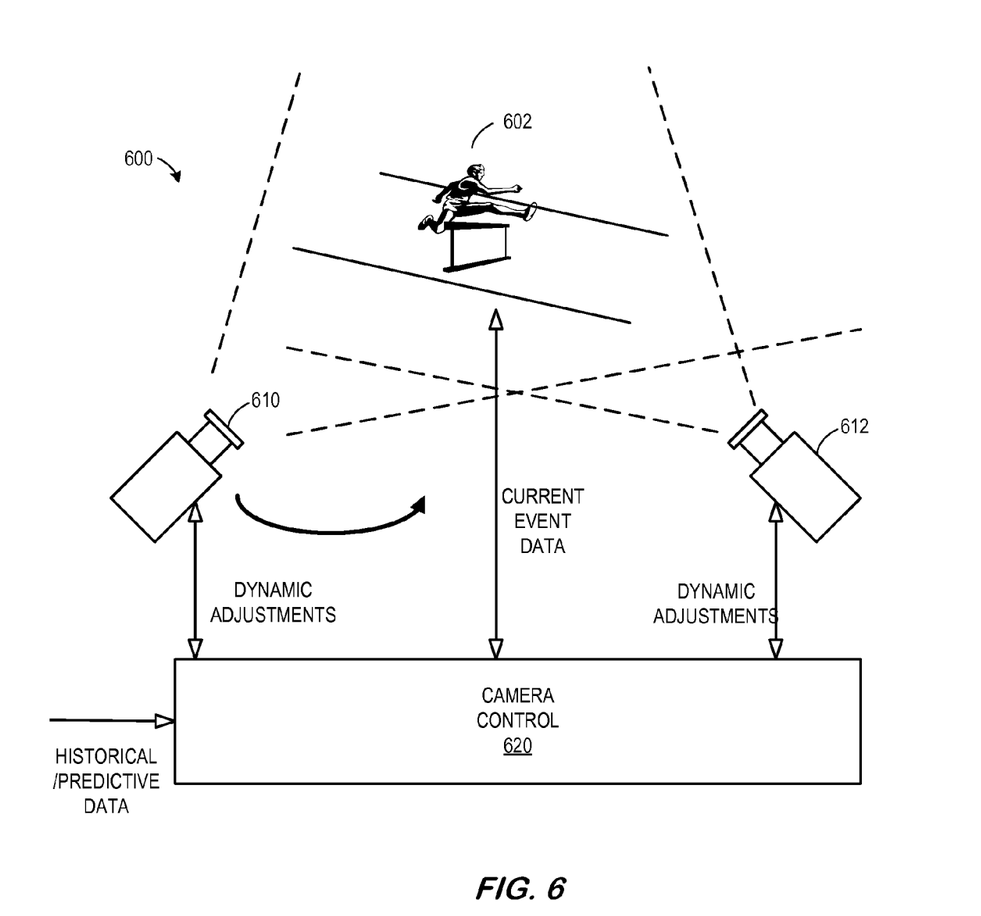
FIG. 6 is an illustration of a system in accordance with another embodiment.

FIG. 6 is a block diagram of a system 600 in accordance with some embodiments of the present invention. The system 600 includes multiple video cameras 610, 612 at an event location 602. Although two video cameras are shown, those skilled in the art will appreciate upon reading this disclosure, that more than two cameras may be deployed and operated using features of the present invention. Each of the video cameras 610, 612 might comprise, for example, an instrumented hard camera that can be dynamically adjusted (e.g., via pan, tilt, zoom, and other motions). Each video camera 610, 612 is in communication with a camera control system 620 to provide and receive data to perform dynamic adjustments of each video camera 610, 612 during the capture of an event. The camera control system 620 may be as described above (e.g., in conjunction with FIGS. 1 and 3).

Multiple camera embodiments may be used in conjunction with a number of different types of events that benefit from different camera angles and different shots. For example, the system may be used to capture a 400 meter track and field race, where a different camera angle is desired when the runners round the track. Pursuant to some embodiments, control signals may be generated to automatically switch from one camera to another at an expected time in the event based on the historical and other data associated with the event.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

While embodiments have been described with respect to sporting events and athletes, those skilled in the art, upon reading this disclosure will appreciate that features of the present invention may be used with desirable results in conjunction with the control of one or more video cameras at other types of events. For example, embodiments may be used to capture video data: at amusement parks (e.g., to capture the action and facial expressions of people riding a roller coaster), at airports (e.g., to capture and track airplane takeoffs and landings, using historical or predictive data about individual plane types, etc.), or the like. Further, while embodiments have been described with respect to robotically controlled video cameras, those skilled in the art, upon reading this disclosure, will appreciate that embodiments may be used with other types of cameras (e.g., to control the taking of still shots of wildlife, or the like).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for creating a video feed of an event, comprising:
   receiving event characteristic information from a data source about the event and participant information associated with one or more event participants, wherein the event characteristic information includes historical event characteristic information about past events of a same event type as the event including a past event duration, and the participant information includes historical participant performance information;
   receiving video camera configuration and position data from at least a first video camera;
   receiving current event data in real time from the event from at least one of an external device and user input to initiate active camera control;
   after initiating camera control, generating control signals based on the event characteristic information and the participant information including the historical participant performance information to follow an expected trajectory of at least one participant;
   transmitting the control signals to the at least first video camera to control the operation of the at least first video camera;
   wherein the control signals cause the at least first video camera to adjust at least one of: (i) a panning motion, (ii) a tilting motion, (iii) a focal change, and (iv) a zooming adjustment; and
   wherein the participant information includes information identifying at least one of expected pace and expected completion time of the event, based on the historical participant performance information.

2. The method of claim 1, further comprising at least a second video camera, the method further comprising:
   receiving video camera configuration and position data from the at least second video camera.

3. The method of claim 2, wherein the generating control signals further comprises generating control signals based on the video camera configuration and position data from the first and second video cameras, the method further comprising:

transmitting the control signals to the first and at least second video cameras to control the operation of the first video camera and the at least second video camera.

4. The method of claim 3, wherein the control signals cause the at least second video camera to adjust at least one of: (i) a panning motion, (ii) a tilting motion, (iii) a focal change, (iv) a zooming adjustment, and (v) transmission of a video feed.

5. The method of claim 1, wherein the at least first video camera is a robotic video camera adapted to receive the control signals over a communications link.

6. The method of claim 1, wherein the at least first video camera is configured to transmit a video feed to a remote production facility.

7. The method of claim 1, wherein the characteristic information includes data associated with the event for use by a camera control system to generate a predicted path and trajectory of the event.

8. The method of claim 7, wherein the characteristic information includes information identifying at least one of (i) an event type, (ii) an event location, and (iii) an event name.

9. A video camera control system, comprising:
a robotic video camera outputting a video feed including a representation of an event and operative under control of camera control data; and
a camera control system transmitting camera control data to the robotic video camera, the camera control data generated based on information received about the event from a data source, including event characteristic information and event participation information, wherein the event characteristic information includes historical event characteristic information about past events of a same event type as the event, and the event participation information includes historical participant performance information;
wherein the camera control data is used by the robotic video camera to follow an expected trajectory of at least one participant using the historical participant information and to cause at least one of: (i) a panning motion, (ii) a tilting motion, (iii) a focal change, and (iv) a zooming adjustment; and
wherein the event participation information includes information identifying at least one of expected pace and expected completion time of the event, based on the historical participant performance information.

10. The system of claim 9, wherein the camera control system receives current event data, wherein the camera control data is further generated based on the current event data.

11. The system of claim 10, wherein the current event data includes data identifying the start of the event.

12. The system of claim 11, wherein the data identifying the start of the event is generated based on an automated detection of the start of the event.

13. The system of claim 9, wherein the camera control system provides the camera control data to the robotic video camera automatically to provide real-time control of the robotic video camera.

14. A non-transitory, computer-readable medium storing instructions adapted to be executed by a processor to perform a method, the method comprising:
receiving event characteristic information from a data source about the event and participant information associated with one or more event participants, wherein the event characteristic information includes historical event characteristic information about past events of a same event type as the event including a past event duration, and the participant information includes historical participant performance information;
receiving video camera configuration and position data from at least a first video camera;
receiving current event data in real time from the event from at least one of an external device and user input to initiate active camera control;
after initiating camera control, generating control signals based on the event characteristic information and the participant information including the historical participant performance information to follow an expected trajectory of at least one participant;
transmitting the control signals to the at least first video camera to control the operation of the at least first video camera;
wherein the control signals cause the at least first video camera to adjust at least one of: (i) a panning motion, (ii) a tilting motion, (iii) a focal change, and (iv) a zooming adjustment; and
wherein the participant information includes information identifying at least one of expected pace and expected completion time of the event, based on the historical participant performance information.

15. The medium of claim 14, the characteristic information includes data associated with the event for use by a camera control system to generate a predicted path and trajectory of the event.

16. The medium of claim 15, wherein the characteristic information includes information identifying at least one of (i) an event type, (ii) an event location, and (iii) an event name.

17. The method of claim 1, further comprising:
identifying a relevant set of camera control parameters to use to control the first video camera based on the historical event characteristic information.

* * * * *